United States Patent
Helfer

(10) Patent No.: US 11,933,426 B1
(45) Date of Patent: Mar. 19, 2024

(54) NOISE ATTENUATION ASSEMBLY FOR FLOW CONTROL DEVICES

(71) Applicant: Fisher Controls International LLC, Marshalltown, IA (US)

(72) Inventor: Wade Helfer, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 18/059,551

(22) Filed: Nov. 29, 2022

(51) Int. Cl.
| | |
|---|---|
| *F16K 5/06* | (2006.01) |
| *F16K 1/14* | (2006.01) |
| *F16K 5/12* | (2006.01) |
| *F16K 47/04* | (2006.01) |
| *F16K 47/08* | (2006.01) |

(52) U.S. Cl.
CPC ............. *F16K 47/045* (2013.01); *F16K 1/14* (2013.01); *F16K 5/0605* (2013.01); *F16K 5/0621* (2013.01); *F16K 5/12* (2013.01); *F16K 47/08* (2013.01)

(58) Field of Classification Search
CPC ........ F16K 5/0621; F16K 5/0605; F16K 5/12; F16K 5/10; F16K 47/08; F16K 47/045
See application file for complete search history.

(56) References Cited

U.S. PATENT DOCUMENTS

| | | | | |
|---|---|---|---|---|
| 4,111,229 A | * | 9/1978 | Christian | ................. F16K 5/10 15/104.062 |
| 5,193,583 A | | 3/1993 | Gethmann et al. | |
| 5,218,984 A | * | 6/1993 | Allen | .................... F16K 5/0605 137/1 |
| 6,029,702 A | * | 2/2000 | Leinen | .................. F16K 5/0605 251/121 |
| 10,100,947 B2 | | 10/2018 | Gattavari | |
| 11,209,100 B2 | * | 12/2021 | Bell | ........................ F16K 47/08 |
| 2011/0073792 A1 | * | 3/2011 | Allen | ...................... F16K 47/08 251/205 |
| 2022/0154849 A1 | * | 5/2022 | Jablonski | ............ F16K 27/0218 |

FOREIGN PATENT DOCUMENTS

EP 0043193 A1 * 1/1982

OTHER PUBLICATIONS

Product Bulletin 51.3, Fisher™ Vee-Ball™ V150, V200, and V300 Rotary Control Valves, www.Fisher.com, Mar. 2021, 28 pages.

* cited by examiner

*Primary Examiner* — Marina A Tietjen
(74) *Attorney, Agent, or Firm* — Quarles & Brady LLP

(57) ABSTRACT

A valve, such as a ball valve, can include a noise attenuation assembly to control fluid expansion through the valve and provide noise abatement. The valve can include a valve body and a valve stem and the noise attenuation assembly can include a flow control body and a trim body. The flow control body can be coupled to the valve stem and the flow control body can be configured to selectively permit fluid flow through the valve body in an axial direction. The trim body can include a plurality of channels to control fluid expansion during fluid flow through the valve body. The trim body can be engaged with the flow control body at first and second mounting structures of the flow control body to secure the trim within a fluid pathway of the flow control body.

18 Claims, 11 Drawing Sheets

NOISE ATTENUATION ASSEMBLY FOR FLOW CONTROL DEVICES

CROSS-REFERENCE TO RELATED APPLICATIONS

Not applicable

BACKGROUND

Flow control devices can be used in a variety of industrial, commercial, and other settings to regulate fluid flowrate. As fluid flows through certain flow control devices, such as quarter-turn valves, for example, the fluid can expand and produce unwanted noise and vibrations. It may be generally useful to manage or control the fluid expansion within a valve body to provide noise abatement.

SUMMARY

Some examples of the disclosed technology provide a valve, such as a ball valve. The valve can include a valve body, a valve stem, a flow control body, and a trim body. The flow control body can be coupled to the valve stem. The flow control body can be configured to selectively permit fluid flow through the valve body in an axial flow direction depending on a rotational orientation of the valve stem. The flow control body can include a ball section, a first mounting structure at a first lateral side of the ball section, relative to the axial flow direction, and a second mounting structure at a second lateral side of the ball section, relative to the axial flow direction. The trim body can include a plurality of channels to control fluid expansion during fluid flow through the valve body. The trim body can be engaged with the first and second mounting structures of the flow control body at first and second lateral sides of the trim body, relative to the axial flow direction, to secure the trim body within a fluid pathway across the flow control body.

Some examples of the disclosed technology provide a noise attenuation assembly for a ball valve. The noise attenuation assembly can include a ball body and an attenuator. The ball body can be configured to selectively permit fluid flow through the ball valve via a fluid pathway that extends in an axial flow direction through the ball body. The fluid pathway can have a ball inlet and a ball outlet. The ball inlet can define a ball inlet profile that extends from a first lateral sides of the ball body to a second lateral side of the ball body. The attenuator can include a plurality of channels that collectively form an attenuator inlet and an attenuator outlet. The attenuator inlet can define an attenuator inlet profile that is geometrically similar to the ball inlet profile and extends from a first lateral side of the attenuator to a second lateral side of the attenuator. The attenuator can be secured relative to the ball body within the fluid pathway so that fluid flow through the ball valve passes through the plurality of channels to reduce noise associated with fluid expansion. The attenuator inlet profile can extend along the ball inlet profile along substantially all of a width of the ball inlet profile between the first and second lateral sides of the ball body.

Some examples of the disclosed technology provide a method of assembling a ball valve. The method can include inserting a ball body into a valve body. The valve body can include first and second lateral ears that are spaced apart by a fluid pathway. After inserting the ball body into the valve body, the method can further include aligning an attenuator within the fluid pathway of the ball body and engaging first and second locator tabs of the attenuator with the respective first and second lateral ears of the ball body to secure the attenuator relative to the ball.

BRIEF DESCRIPTION OF THE DRAWINGS

The accompanying drawings, which are incorporated in and form a part of this specification, illustrate examples of the disclosed technology and, together with the description, serve to explain the principles of examples of the disclosed technology.

DETAILED DESCRIPTION

Figure 1:
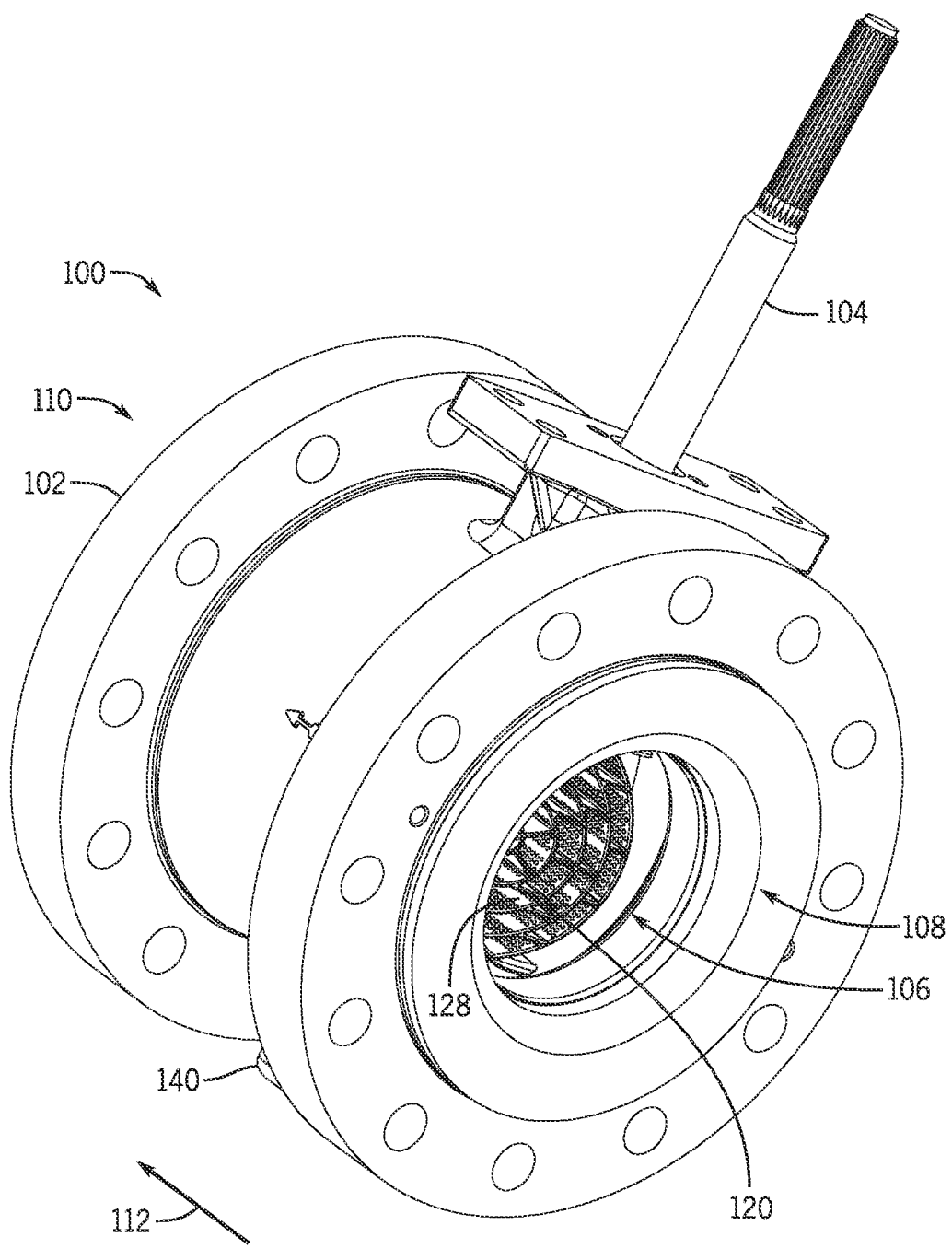
FIG. 1 is an isometric view of a valve with a noise attenuation assembly according to an example of the disclosed technology.

The following discussion is presented to enable a person skilled in the art to make and use examples of the disclosed technology. Various modifications to the illustrated examples will be readily apparent to those skilled in the art, and the generic principles herein can be applied to other examples and applications without departing from the disclosed technology. Thus, examples of the disclosed technology are not intended to be limited to examples shown, but are to be accorded the widest scope consistent with the principles and features disclosed herein. The following detailed description is to be read with reference to the figures, in which like elements in different figures have like reference numerals. The figures, which are not necessarily to scale, depict selected examples and are not intended to limit the scope of examples of the disclosed technology. Skilled artisans will recognize the examples provided herein have many useful alternatives and fall within the scope of disclosed technology.

Before any examples of the disclosed technology are explained in detail, it is to be understood that the disclosed technology is not limited in its application to the details of construction and the arrangement of components set forth in the following description or illustrated in the attached drawings. The disclosed technology is capable of other examples and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," "secured," and "coupled" and variations thereof, as used with reference to physical connections, are used broadly and encompass both direct and indirect mountings, connections, supports, and couplings. Further, unless otherwise specified or limited, "connected," "attached," or "coupled" are not restricted to physical or mechanical connections, attachments or couplings.

Also as used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Also as used herein, unless otherwise limited or defined, "substantially all" and derivatives thereof, relative to a reference quantity, indicates a value of 93% or more of the reference quantity (e.g., 95%, 98%, 99%, etc.). Correspondingly, a first feature that extends along or exhibits a particular quality along substantially all of the length of a reference feature extends along or exhibits the particular quality along at least 93% of the length of the reference feature. Thus, for example, a trim profile that is described as geometrically similar to a ball profile over substantially all of the ball profile is geometrically similar to the ball profile over at least 93% of the length of the reference feature (e.g., is complementarily shaped so as to nest with the ball profile over at least 93% of the relevant length).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "only one of," or "exactly one of" For example, a list of "only one of A, B, or C" indicates options of: A, but not B and C; B, but not A and C; and C, but not A and B. In contrast, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more A, one or more B, and one or more C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: one or more A and one or more B; one or more B and one or more C; one or more A and one or more C; and one or more A, one or more B, and one or more C.

In some implementations, devices or systems disclosed herein can be utilized, manufactured, installed, etc. using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

As briefly discussed above, flow control devices can be used in a variety of industrial, commercial, and other settings to regulate fluid flowrate. As fluid flows through certain flow control devices, such as quarter-turn valves, for example, the fluid can expand and produce unwanted noise and vibrations. It may be generally useful to manage or control the fluid expansion within a valve body to provide noise abatement.

Embodiments of the present disclosure can address certain drawbacks of noisy, conventional flow control devices. In particular, disclosed herein is a noise attenuation assembly that can be installed in a flow control device, such as a quarter-turn valve, to control the unwanted and potentially noisy expansion of fluid flowing through the valve body of the quarter-turn valve. The noise attenuation assembly can include a flow control body and a trim having a plurality of openings to control the expansion of fluid passing through the trim. As fluid flows through the noise attenuation assembly, the expansion of fluid is controlled and limited by the openings in the trim to provide noise abatement.

Some conventional valves can include suboptimal noise abatement elements that only slightly reduce the noise associated with uncontrolled fluid expansion. For example, some conventional valves can include large clearances between a noise abatement element and a flow control body of the valve. With conventional designs, these large clearances are often necessary for manufacturing and assembly. In particular, the assembly of such conventional valves can include engaging the noise abatement element with the flow control body before inserting the flow control body into the valve body. Relatively large clearances are often then required so that there is sufficient space to manipulate and secure the flow control body to a valve stem, and in general, relative to the valve body. The presence of these clearances once the valve is assembled can permit the uncontrolled expansion of fluid flowing through the valve, corresponding to relatively inefficient and ineffective abatement of valve noise.

In this regard, it may be generally useful to reduce or remove clearances between a noise attenuator and a flow control body of a valve. Furthermore, it may be generally useful to provide noise attenuation assemblies that can be assembled after a flow control body is installed in (e.g., secured to) a valve body. In general, given the size and limited space inside a valve once the flow control body is secured relative to the valve body, it may be difficult to maneuver, manipulate, and orient a noise attenuator relative to the flow control body. Thus, embodiments of the present disclosure provide a noise attenuation assembly having a plurality of constraints that can aid in properly positioning the noise attenuator relative to a flow control body, and in particular, a flow control body that has already been installed in a valve body. The plurality of constraints can constrain the noise attenuator relative to the flow control body in the six degrees of freedom (e.g., x, y, z, X, Y, Z) associated with displacement and rotation.

Figure 2:
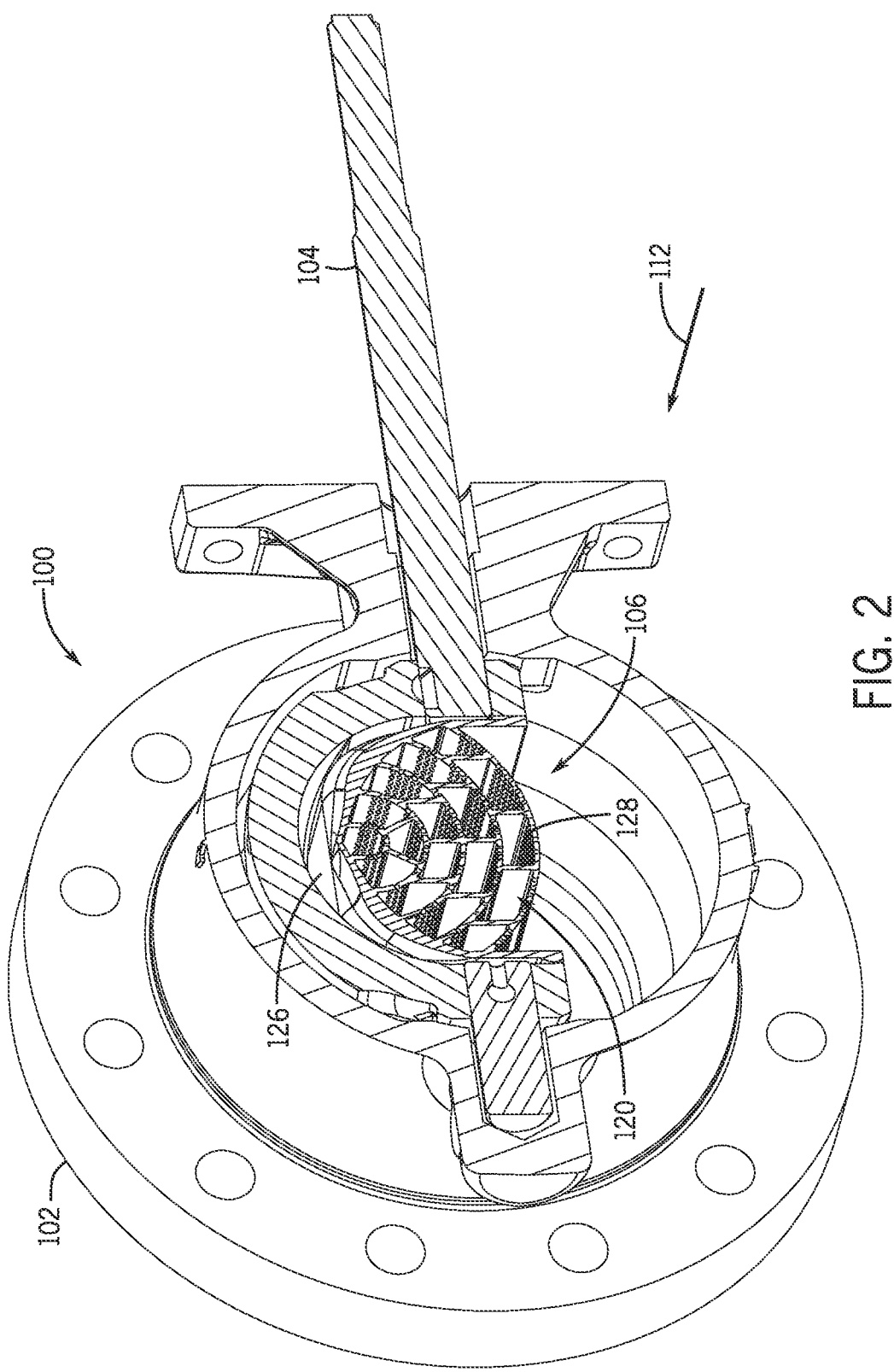
FIG. 2 is a cross-sectional isometric view of the valve and noise attenuation assembly of FIG. 1.
Figure 3:
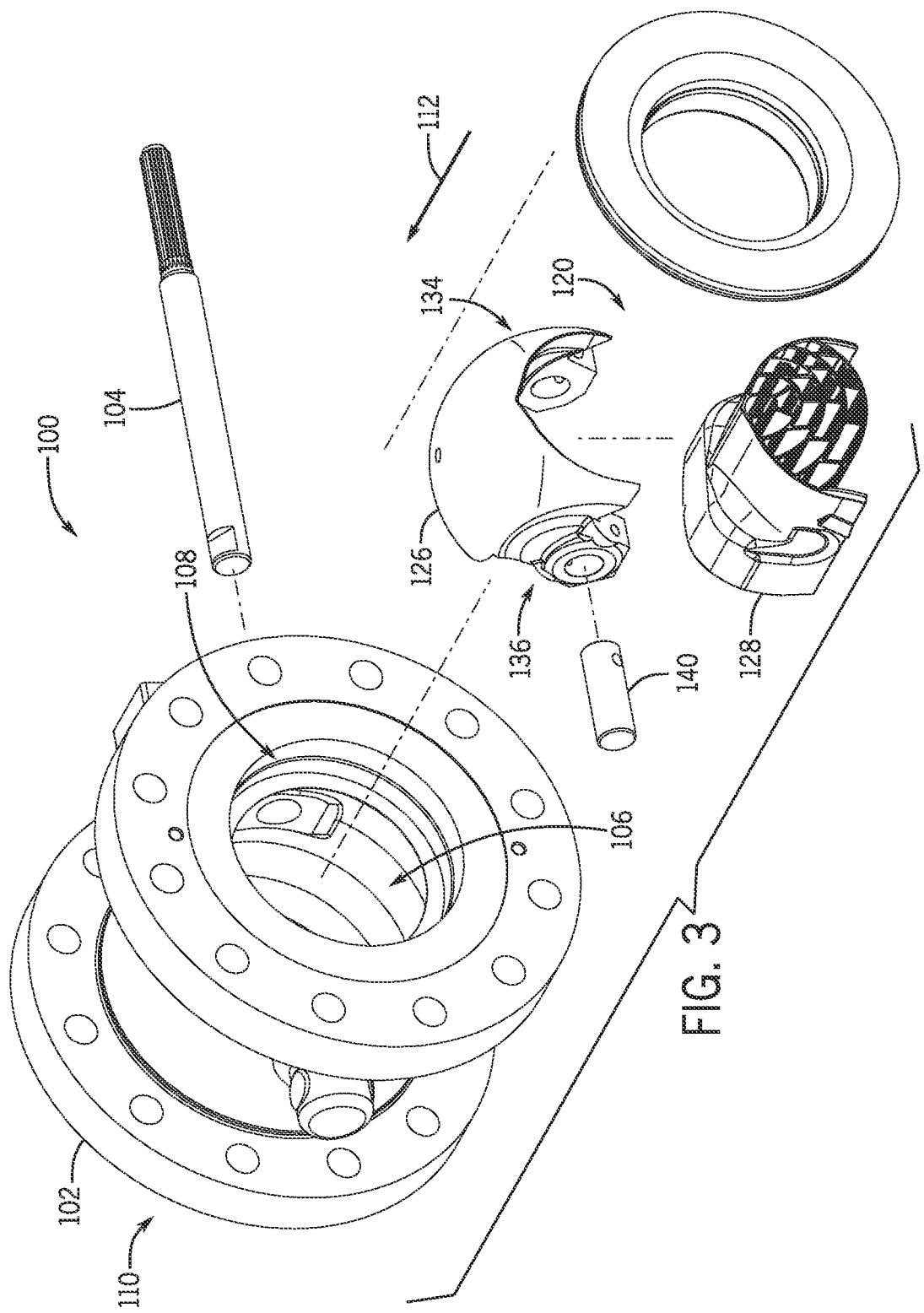
FIG. 3 is an exploded isometric view of the valve and noise attenuation assembly of FIG. 1.

Referring now to FIGS. 1-3, a valve 100 is shown. The valve 100 includes a valve body 102 and a valve stem 104. The valve body 102 generally defines a fluid pathway 106 extending between an inlet 108 and an outlet 110 of the valve 100. However, in some configurations, the inlet 108 and the outlet 110 may be reversed or otherwise oriented relative to fluid flow. In general, the inlet 108 is oriented upstream of the fluid flow and the outlet 110 is oriented downstream of the fluid flow. In the illustrated embodiment, an exemplary direction of fluid flow is indicated by arrow 112, which generally defines an axial flow direction of the valve 100 and corresponds to a direction of fluid flow through the valve body 102 or components therein (as further discussed below). Correspondingly, unless otherwise noted, reference to "lateral" directions herein indicate a transverse direction relative to an axial flow direction (e.g., a radial direction relative to the arrow 112).

In the illustrated example, the valve 100 is equipped with a noise attenuation assembly 120. The noise attenuation assembly 120 is configured to control and reduce fluid expansion as fluid flows through the fluid pathway 106 of the valve 100. Such fluid expansion can cause unwanted noise and vibration in some conventional valves. Thus, the noise attenuation assembly 120 can address excessive noise and other drawbacks of conventional valves and conventional trim arrangements to reduce noise associated with fluid flow through the valve, as will be described in greater detail below.

As shown in FIGS. 2 and 3, the noise attenuation assembly 120 can include a flow control body 126 and a trim 128. Each of the flow control body 126 and the trim 128 can be formed as an independent, unitary body (e.g., each separately formed as a respective integral component). The flow control body 126 can generally be configured as a ball body or ball (e.g., a ball of a quarter-turn ball valve) and can thus selectively permit fluid flow through the fluid pathway 106 of the valve 100 (or block fluid flow) depending on the rotational orientation of the flow control body 126 relative to the valve body 102. The flow control body 126, configured as the ball of the valve 100, can be coupled to the valve stem 104 at a first lateral side 134 and to a shaft follower 140 at a second lateral side 136. Although the particular shape and size of the illustrated example can be particularly beneficial for some installations, other types of flow control bodies are possible, including otherwise shaped or sized ball bodies.

In use, the valve stem 104 can actuate the flow control body 126 to move the flow control body 126 between an open orientation and a closed orientation relative to the valve body 102. In the open orientation, the flow control body 126 can permit fluid flow through the fluid pathway 106 of the valve 100 and in the closed orientation, the flow control body 126 can prevent fluid flow through the fluid pathway 106 of the valve 100, with reduced-capacity flow also permitted in some intermediate orientations between open and closed. FIGS. 1 and 2 show the flow control body 126 in an open orientation. The valve stem 104 can extend through an opening in the valve body 102 to engage the flow control body 126 and the shaft follower 140 can extend between a recess in the valve body 102 and the flow control body 126. In general, the shaft follower 140 may share a shaft axis with the valve stem 104 and can be configured to axially secure and align the flow control body 126 within the fluid pathway 106 of the valve 100.

With reference to FIG. 3, the valve stem 104 can include a keyed axial end that engages with the first lateral side 134 of the flow control body 126. The keyed arrangement of the valve stem 104 allows for the valve stem 104 to engage the flow control body 126 and rotate the flow control body 126 as the valve stem is rotated. Further, the shaft follower 140 can include an opening in an axial end that can allow for a pin to rotationally secure the shaft follower 140 to the flow control body 126. However, other arrangements of coupling the valve stem 104 and the shaft follower 140 to the flow control body 126 are possible, including other keyed arrangements, pinned arrangements, and other fastener configurations, such as, for example, bolts, screws, clips, ties, adhesives, interference fits, and combinations thereof.

As further shown in FIGS. 1-3, the noise attenuation assembly 120 can further include the trim body or trim 128. The trim 128 can be configured as a noise attenuator that can reduce noise associated with fluid expansion during fluid flow through the valve 100. As shown in FIG. 2, the trim 128 is secured relative to the flow control body 126 and within the fluid pathway 106 of the valve 100. The trim 128 is secured relative to the flow control body 126 so that when the flow control body 126 is actuated (i.e., rotated) via the valve stem 104, the trim 128 is rotated in the same direction (and the same degree of rotation).

Figure 4:
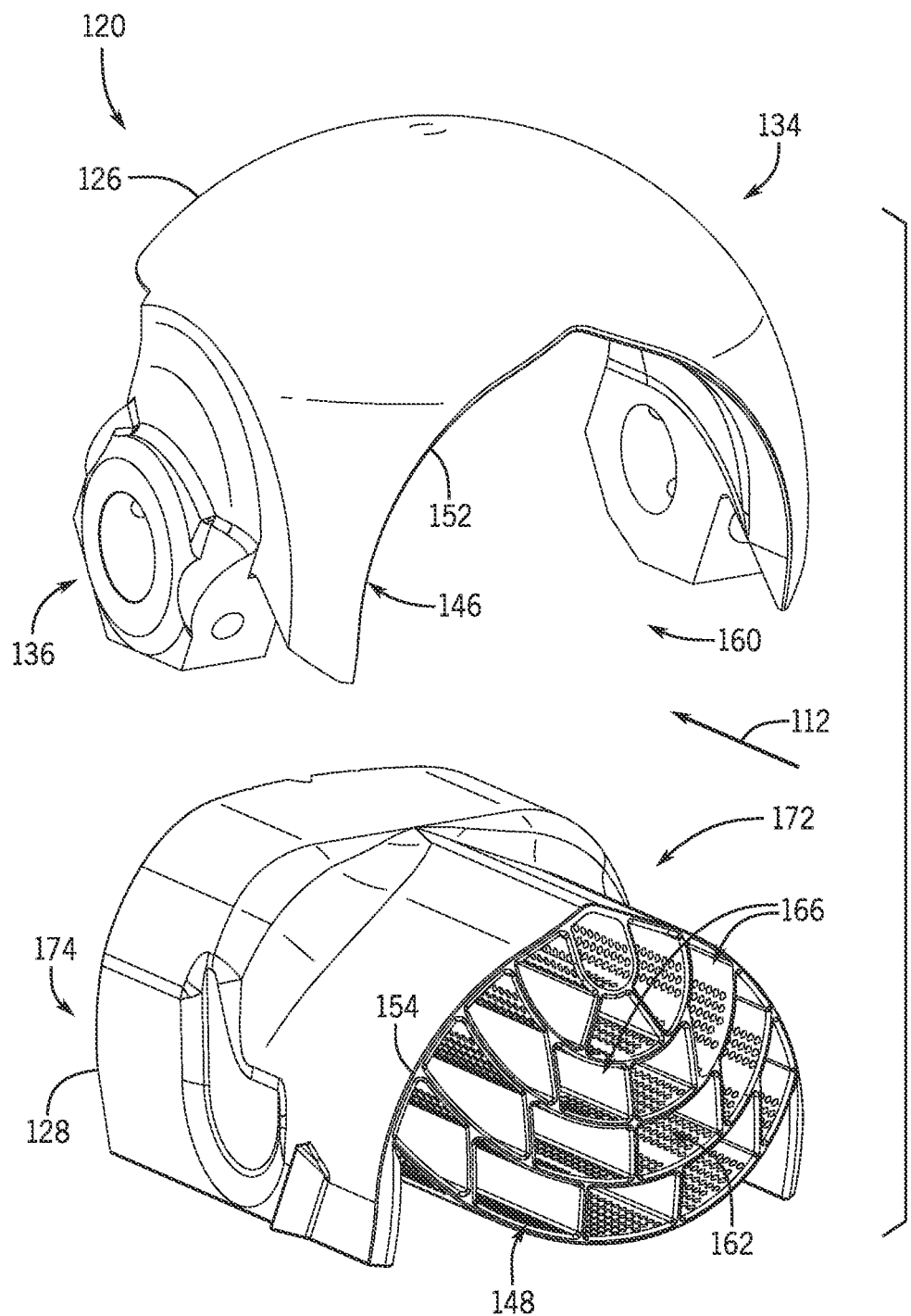
FIG. 4 is an exploded isometric view of the attenuation assembly of FIG. 1.

With reference to FIG. 4, each of the flow control body 126 and the trim 128 define respective inlets 146, 148 that are configured to align with the inlet 108 of the valve body 102 when the flow control body 126 is in the open orientation (see, for example, FIG. 1). The inlet 146 of the flow control body 126 defines a flow control body inlet profile 152 and the inlet 148 of the trim 128 defines a trim inlet profile 154. In the illustrated example, the flow control body inlet profile 152 is complementary to the trim inlet profile 154. That is, the flow control body inlet profile 152 is geometrically similar to the trim inlet profile 154 and, in the illustrated example, can thus effectively extend locally in parallel to and in close proximity to the trim inlet profile.

Thus, in some embodiments, the flow control body inlet profile 152 can be obtained from the trim inlet profile 154 by scaling the respective profile, and vice versa. In particular, in the illustrated example, the inlet profile 152 is geometrically complementary to the trim inlet profile 154 over all of (or at least substantially all of) the trim inlet profile 154, although other configurations are possible. In some embodiments, there can be a relatively small clearance between the flow control body inlet profile 152 and the trim inlet profile 154 transverse to the flow direction 112. The relatively small clearance may be less than or equal to 0.010 inches (0.25 millimeters), which can provide a generally snug fit between the flow control body 126 and the trim 128. In other examples, the clearance may be between approximately 0.005 inches (0.1 millimeters) and approximately 0.05 inches (1 millimeter).

The flow control body inlet 146 can provide an entrance (or optionally an exit) to a fluid pathway 160 defined by the flow control body 126. When the flow control body 126 is in an open orientation within the valve body 102, the fluid pathway 160 of the flow control body 126 is axially aligned with fluid pathway 106 of the valve body 102. In contrast, when the flow control body 126 is in the closed (i.e., fully closed) orientation, the fluid pathway 160 of the flow control body 126 is generally perpendicular to the fluid pathway 106 of the valve body 102. Similarly, the trim inlet 148 can provide an entrance (or optionally an exit) to a fluid pathway 162 defined by the trim 128. When the flow control body 126 is in an open orientation within the valve body 102, the fluid pathway 162 of the trim 128 is axially aligned with the fluid pathway 106 of the valve body 102 and when the flow control body 126 is in the closed orientation, the fluid pathway 162 of the trim 128 is generally perpendicular to the fluid pathway 106 of the valve body 102.

As further shown in FIG. 4 (and described below with respect to FIGS. 9-14), the trim 128 can include a plurality of flow passages between upstream (or leading) and downstream (or trailing) sides of the trim 128, generally shown and discussed as channels 166. In the example illustrated, each channel of the plurality of channels 166 extends axially fully through the trim 128 in the direction of the flow pathway 162 of the trim 128, although other configurations are also possible. As briefly discussed above, the trim 128 (e.g., via the plurality of channels 166) can help to reduce noise associated with fluid expansion when fluid flows through the valve 100. In general, the noise reduction can occur during a change in valve orientation (e.g., opening or closing the valve 100) and during constant (e.g., steady state) or dynamic fluid flow.

The plurality of channels 166 are arrayed laterally across the fluid pathway 162 of the trim 128 between a first lateral side 172 and a second lateral side 174 of the trim 128. In particular, when the trim 128 is secured relative to the flow control body 126, the first lateral side 172 of the trim 128 can be adjacent to the first lateral side 134 of the flow control body 126 and the second lateral side 174 of the trim 128 can be adjacent to the second lateral side 136 of the flow control body 126. In this regard, the plurality of channels 166 can be arrayed laterally across substantially all of the lateral width of the fluid pathway 160 of the flow control body 126. In particular, in some examples, the plurality of channels 166 can extend across an entire lateral width of the flow control body inlet 146 in that is perpendicular to the axial flow direction 112 and to an axis of rotation of the trim (and the flow control body 126).

With reference now to FIGS. 5-8, the flow control body 126, generally configured as a ball of a quarter turn valve (e.g., the valve 100) or otherwise, can include first and second ears 180, 182 at the respective first and second lateral sides 134, 136. The first ear 180 can include a lateral opening 184 dimensioned to receive the valve stem 104 and the second ear 182 can include a lateral opening 186 dimensioned to receive the shaft follower 140. In the illustrated embodiment, the first and second lateral openings 184, 186 share a common axis. Each of the ears 180, 182 can further include a respective mount surface 190, 192 that faces the inlet 146 of the flow control body 126.

Figure 5:
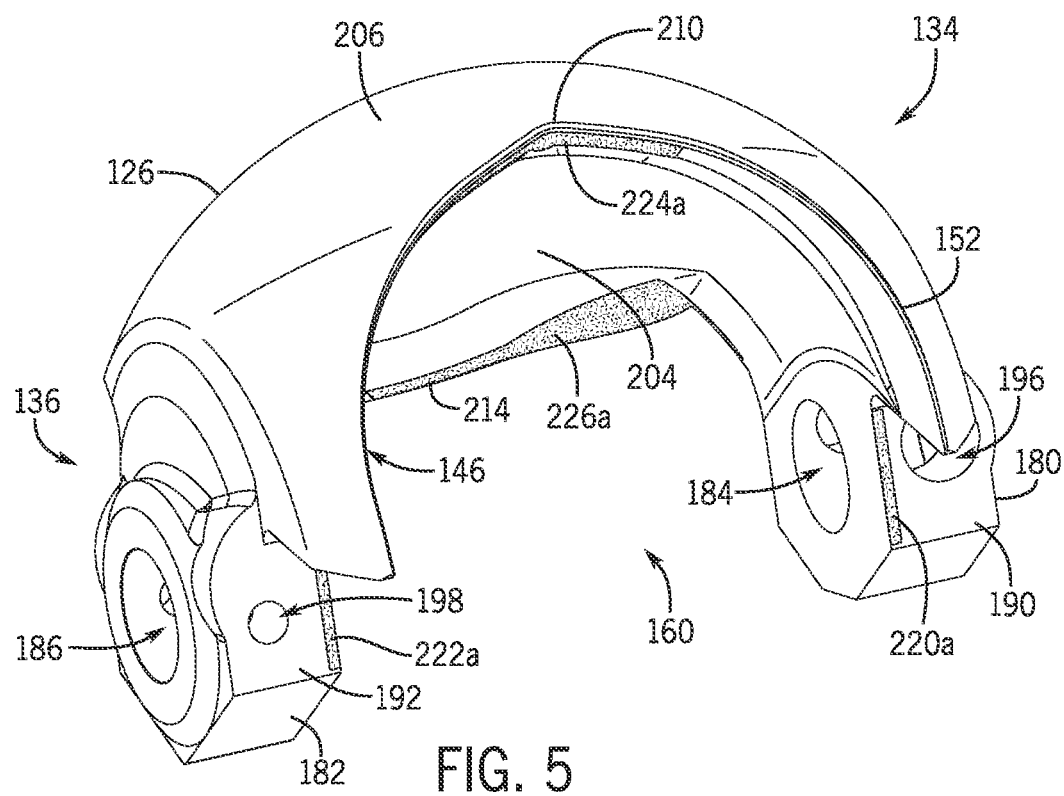
FIG. 5 is a front isometric view of a flow control body of the noise attenuation assembly of FIG. 4, formed as a quarter-turn ball body.
Figure 6:
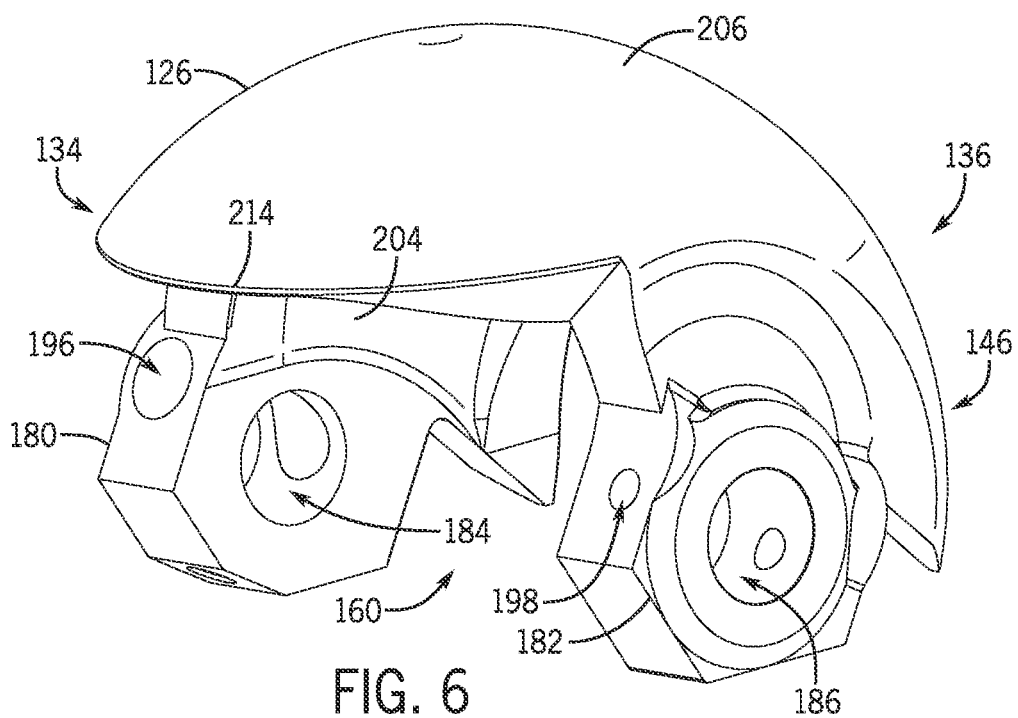
FIG. 6 is a rear, side isometric view of the flow control body of FIG. 5.

As shown in FIGS. 5 and 6, the first ear 180 includes a locking opening 196 that extends axially through the mount surface 190 (relative to the axial flow direction) and through an opposing side of the first ear 180 to intersect the lateral opening 184. Similarly, the second ear 182 includes a locking opening 198 that extends axially through the mount surface 192 (relative to the axial flow direction) and through an opposing side of the second ear 182 to intersect the lateral opening 186. In use, each of the locking openings 196, 198 may be used to secure the flow control body 126 to the valve stem 104 and in general, secure the noise attenuation assembly 120 relative to the valve 100. In other embodiments, other mounting structures can be provided to secure a flow control element to a valve stem, including structures other than the ears 180, 182 and the corresponding lateral openings 184, 186 and locking openings 196, 198.

As further shown in FIGS. 5-8, the flow control body 126 can define an interior surface 204 that faces (and defines the outer boundaries of) the fluid pathway 160 of the flow control body 126. Correspondingly, the flow control body 126 can define an exterior surface 206 that is opposite the interior surface 204. The inlet profile 152 of the flow control body 126 generally provides a boundary between the interior surface 204 and the exterior surface 206 of the flow control body 126 at the inlet 146. As shown, the inlet 146, and thus the inlet profile 152, extends laterally across substantially all of the distance between the first lateral side 134 and the second lateral side 136 of the flow control body 126. Further, the inlet profile 152 can define an inlet apex 210. The inlet apex 210 is located at a peak of the inlet profile 152 between the first and second lateral sides 134, 136.

In addition to the inlet profile 152, the flow control body 126 can further define an outlet profile 214. The outlet profile 214 of the flow control body 126 can generally provide a boundary between the interior surface 204 and the exterior surface 206 of the flow control body 126. As shown in FIG. 6, the outlet profile 214 is at least partially formed by the first and second ears 180, 182 at the respective first and second lateral sides 134, 136 of the flow control body 126. Additionally, each of the ears 180, 182 are axially offset from the inlet profile 152 and therefore generally disposed downstream (with respect to the direction of flow) of the flow control body inlet 146.

Generally, a trim body and corresponding flow control body according to the disclosed technology can include a discrete number of discretely bounded constraint surfaces, that are sized and arranged to seat against each other to locate and appropriately constrain the trim body relative to the flow control body. In some embodiments, at least four constraint surfaces can be provided on each (or either) component, including at opposing lateral sides or adjacent to leading (upstream) and trailing (downstream) edges of the relevant bodies. For example, with reference to FIGS. 7 and 8, the flow control body 126 can include a first constraint surface 220*a*, a second constraint surface 222*a*, a third constraint surface 224*a*, and a fourth constraint surface 226*a*. In general, as will be described in greater detail below, each of the constraint surfaces 220*a*-226*a* are dimensioned to contact a corresponding constraint surface 220*b*-226*b* of the trim 128. Each constraint surface is configured to spatially align, stabilize, and constrain the trim 128 relative to the flow control body 126. For example, during an assembly process of the noise attenuation assembly 120, the constraint surfaces 220*b*-226*b* can align the trim 128 relative to the flow control body 126 in only a single orientation so that the trim 128 can be reliably axially and rotationally aligned with the flow control body 126 in a fully-installed orientation.

In the fully-installed orientation, the trim 128 may thus be unable to rotate or slide relative to the flow control body 126, except in a reverse of the direction in which the trim 128 was inserted into the fluid pathway 160 of the flow control body 126 (e.g., the vertical direction shown in FIG. 4). Correspondingly, during an assembly process of the noise attenuation assembly 120, once the trim 128 is aligned in the single, fully-installed orientation relative to the flow control body 126, the trim 128 can be secured relative to the flow control body 126 so that the trim 128 is no longer movable relative to the flow control body 126, including in the single (e.g., vertical) direction of installation.

Figure 7:
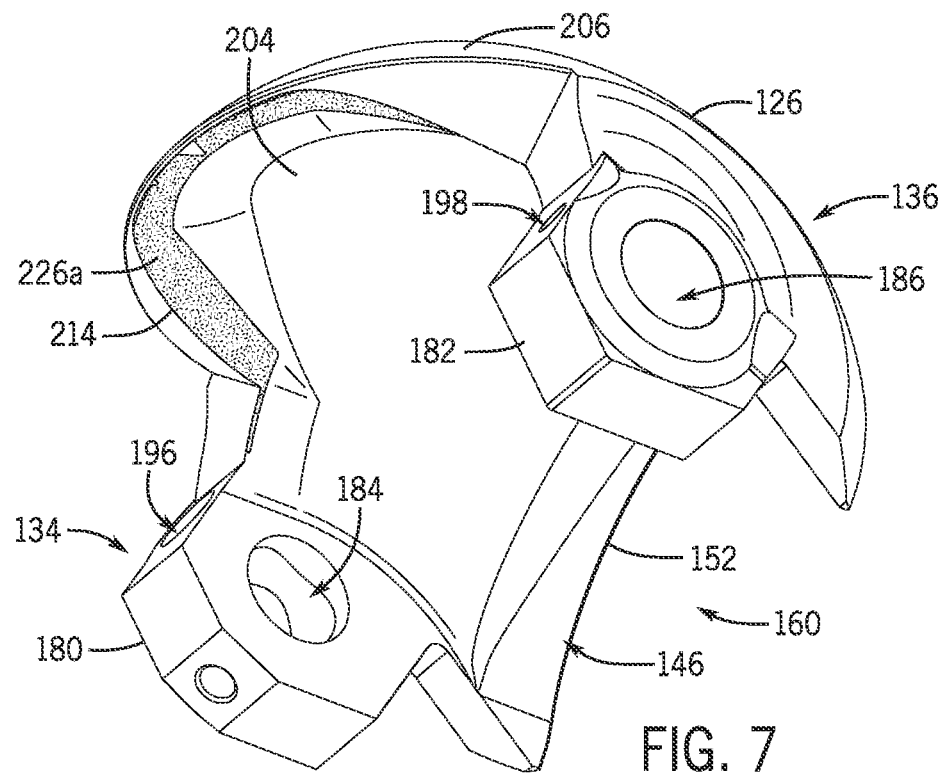
FIG. 7 is a bottom, rear isometric view of the flow control body of FIG. 5.
Figure 8:
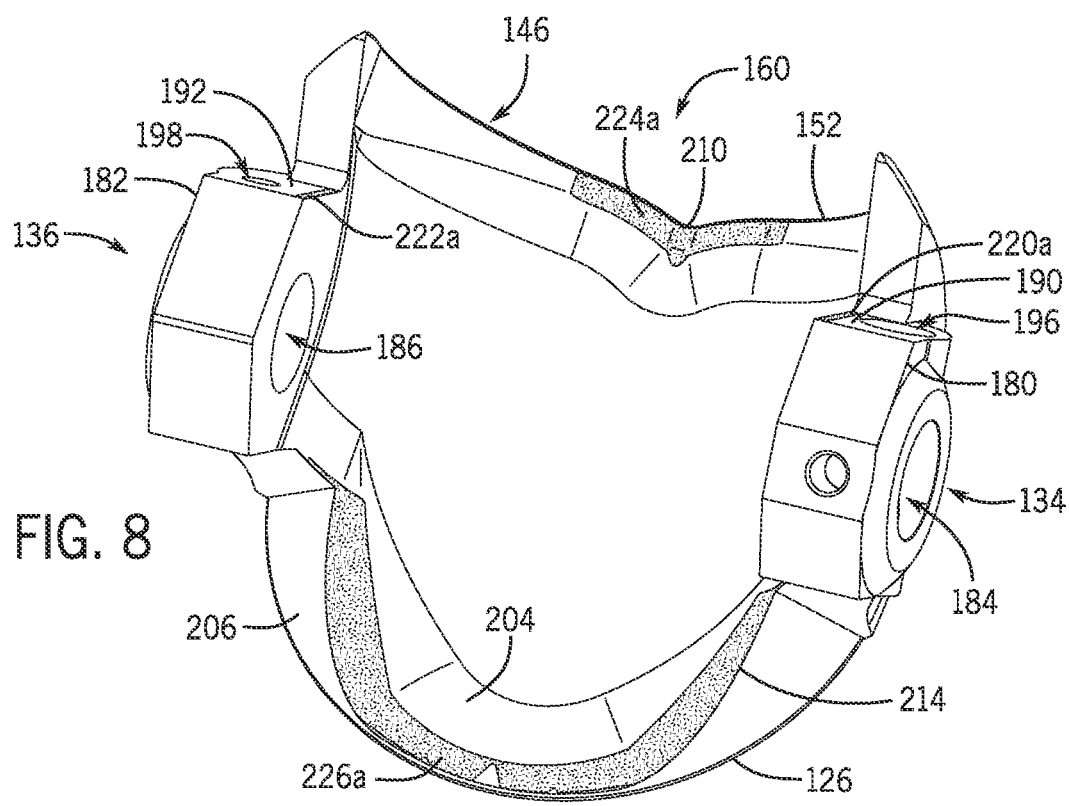
FIG. 8 is a bottom isometric view of the flow control body of FIG. 5.

With continued reference to FIGS. 7 and 8, the first and second constraint surface 220a, 222a are disposed on the respective first and second mounting surfaces 190, 192 of the ears 180, 182. In particular, the first and second constraint surface 220a, 222a are located on radially inward sides of the respective mount surfaces 190, 192. In use, the first and second constraint surface 220a, 222a can be used to align and constrain the trim 128 relative to the flow control body 126 in the axial flow direction 112 (i.e., the flow direction through the flow control body 126).

The third constraint surface 224a is disposed along the interior surface 204 of the flow control body 126 at the inlet apex 210 of the inlet profile 154. The third constraint surface 224a extends laterally on either side of the inlet apex 210 and generally forms a V-shape. In particular, the V-shape can be complementary to the corresponding apex of the inlet profile 154 so as to seat closely against the inlet profile 154 (see, e.g., FIG. 9) at the apex thereof.

In use, the third constraint surface 224a can generally aid in rotationally and laterally aligning the trim 128 relative to the flow control body 124. For example, the engagement between the trim 128 and the flow control body 126 at the third constraint surface 224a (and 224b) can rotationally align the trim 128 about the flow axis 112 and laterally align the trim 128 between the first and second lateral sides 134, 136 of the flow control body 126.

In the illustrated embodiment, the third constraint surface 224a is shown as extending laterally along the inlet profile 152 at the inlet apex 210. However, in other embodiments, the third constraint surface 224a can extend longer or shorter than as shown, or it may be split into separate sub-constraint surfaces. For example, the constraint surface adjacent to the inlet 146 may exist on either side of the inlet apex 210 with or without extending across the inlet apex 210.

Still referring to FIGS. 7 and 8, the fourth constraint surface 226a is disposed along the interior surface 204 of the flow control body 126 at the outlet profile 214. The fourth constraint surface 226a extends between the first and second lateral sides 134, 136 of the flow control body 126.

Similar to the third constraint surface 224a, the fourth constraint surface 226a can generally aid in rotationally and laterally aligning the trim 128 relative to the flow control body 126. For example, the engagement between the trim 128 and the flow control body 126 at the fourth constraint surface 226a (and 226b) can rotationally align the trim 128 about the flow axis 112 and laterally align the trim 128 between the first and second lateral sides 134, 136 of the flow control body 126.

In the illustrated embodiment, the fourth constraint surface 226a is shown as extending laterally along the outlet profile 214, however, in other embodiments, the fourth constraint surface 226a can extend longer or shorter than as shown. Additionally or alternatively, the fourth constraint surface 226a can be split into separate sub-constraint surfaces. For example, the constraint surface adjacent to the outlet profile 214 may exist in two or more sections along the interior surface 204.

With reference now to FIGS. 9-14, the trim 128, which can generally be configured as a noise attenuator for the noise attenuation assembly 120, includes the plurality of channels 166 disposed between the first and second lateral sides 172, 174 of the trim 128. As described above, the plurality of channels 166 are generally configured to control fluid expansion during fluid flow through a valve equipped with the noise attenuation assembly 120.

In some examples, each channel (e.g., channel 166') of the plurality of channels 166 can be at least partially formed by one or more partitions or channel walls 228. Thus, the plurality of channels 166 can be collectively formed by a plurality of channel walls 228. The channel walls 228 can separate the channels of the plurality of channels 166 by row walls 232 (e.g., extending radially between the lateral sides 172, 174) and side-by-side via sidewalls 234 (e.g., extending in a general vertical direction with respect to FIG. 9).

Figure 12:
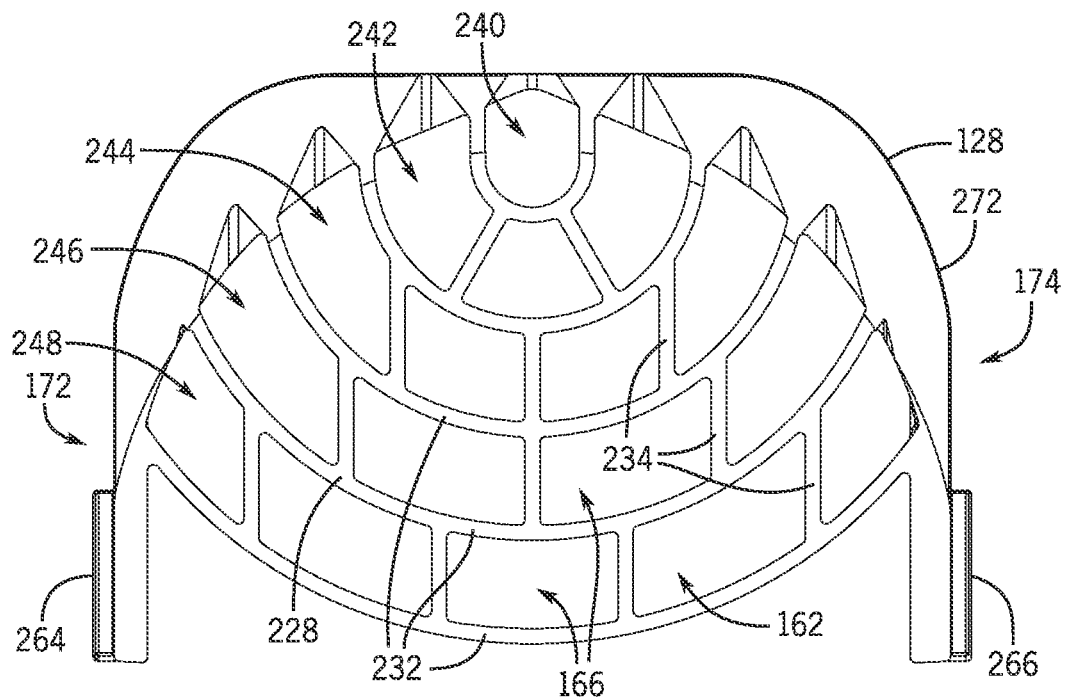
FIG. 12 is a rear elevation view of the noise attenuator of FIG. 9.
Figure 13:
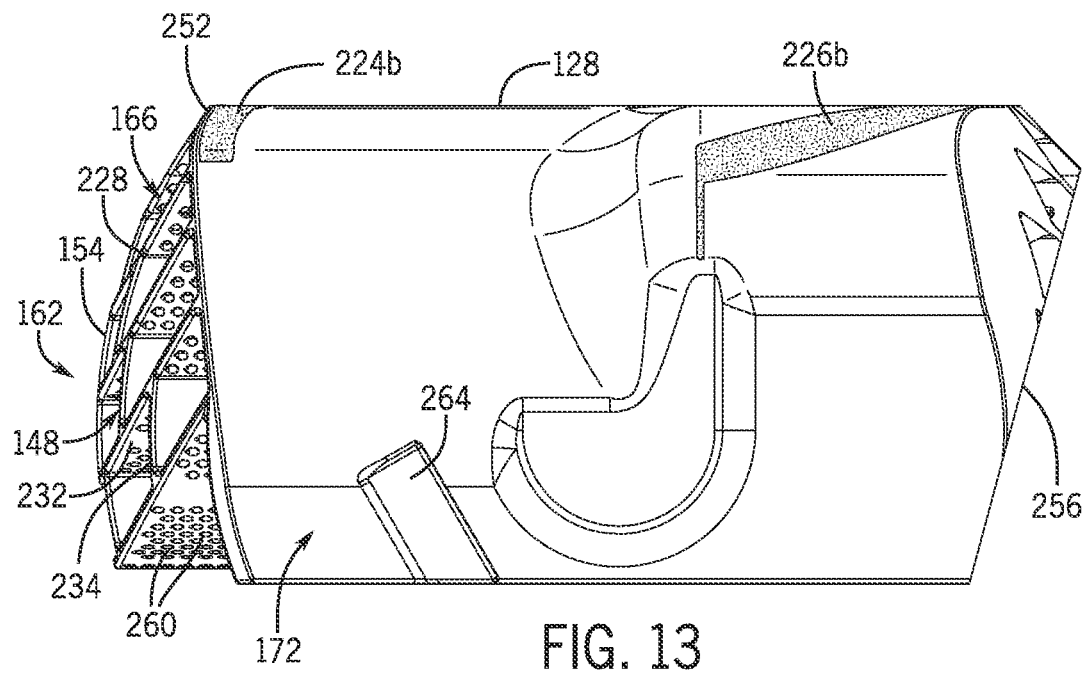
FIG. 13 is right side view of the noise attenuator of FIG. 9.
Figure 14:
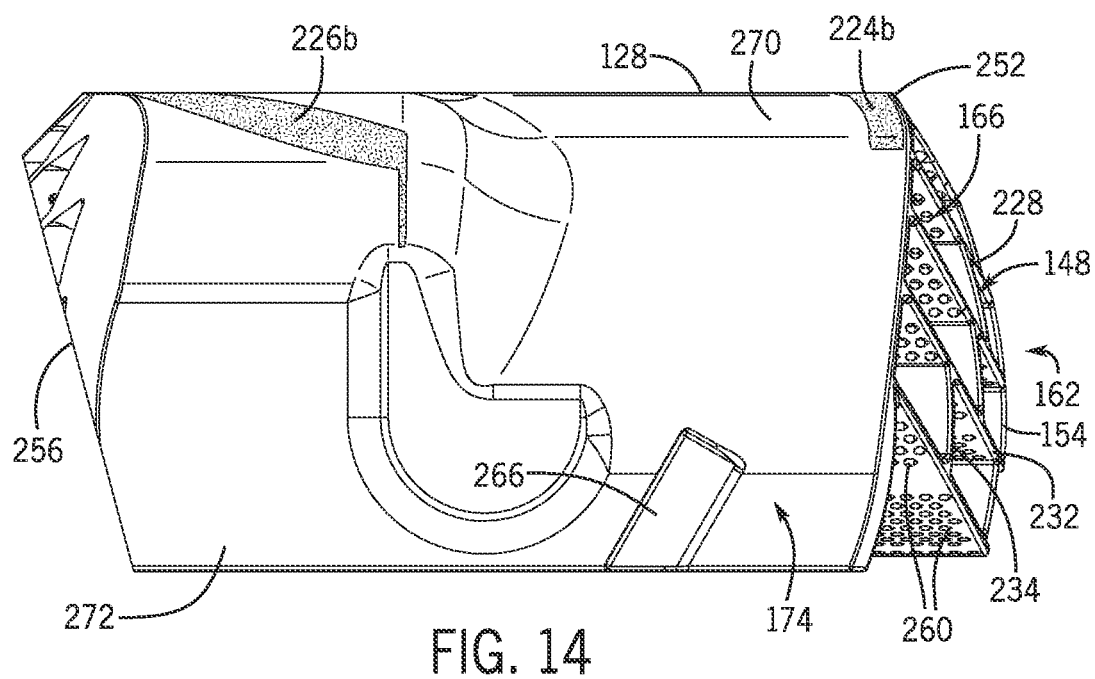
FIG. 14 is a left side view of the noise attenuator of FIG. 9.

In the illustrated embodiment, the plurality of channels 166 are arranged in five rows (see, for example, FIG. 12). In the first row 240, the trim 128 includes a single channel. In the second row 242, the trim 128 includes three channels. In the third row 244, the trim 128 includes four channels. In the fourth row 246, the trim 128 includes four channels. And in the fifth row 248, the trim 128 includes five channels. As further illustrated in FIG. 12, the channels of the plurality of channels 166 can each define similar or different-shaped cross sections. It should be appreciated that a wide variety of cross sections and amounts of channels within the plurality of channels 166 is possible.

As also shown in FIG. 12, the rows of channels 242, 244, 246, 248 are generally arranged concentrically about the first row channel 240 and the first row channel 240 is centered between the first and second lateral sides 172, 174 of the trim 128. Furthermore, the first row channel 240 is at least partly defined by the trim inlet profile 154, and in particular, the trim inlet apex 252 of the inlet profile 154. Additionally, each lateral end channel of each row of channels partly defines the trim inlet profile 154. Similarly, each lateral end channel of each row of channels partly defines a trim outlet profile 256. Thus, the plurality of channels 166 collectively form the trim inlet profile 154. As a result, a distal portion of the trim 128 (e.g., a portion opposite the trim inlet apex 252 and adjacent to the fifth row 248 of channels) can extend fully between the lateral sides 134, 136 of the flow control body 126 when the trim 128 is secured relative to the flow control body 126.

Figure 9:
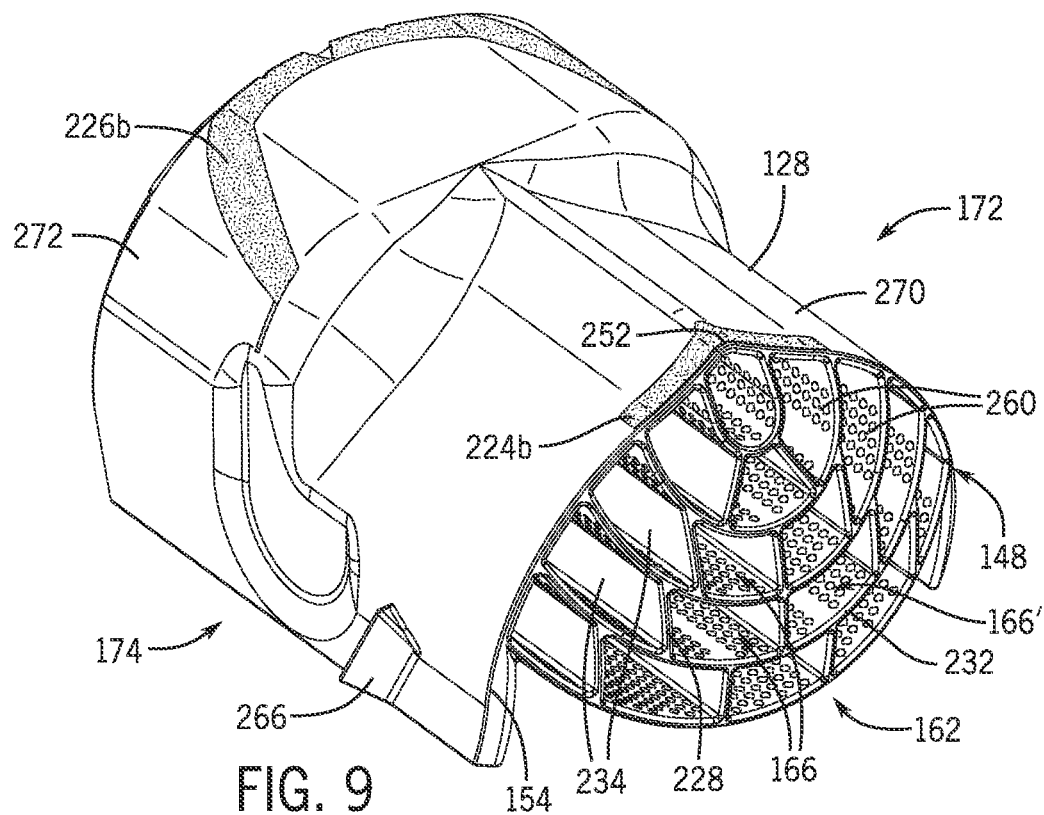
FIG. 9 is a top, front isometric view of a noise attenuator of the noise attenuation assembly of FIG. 4.
Figure 10:
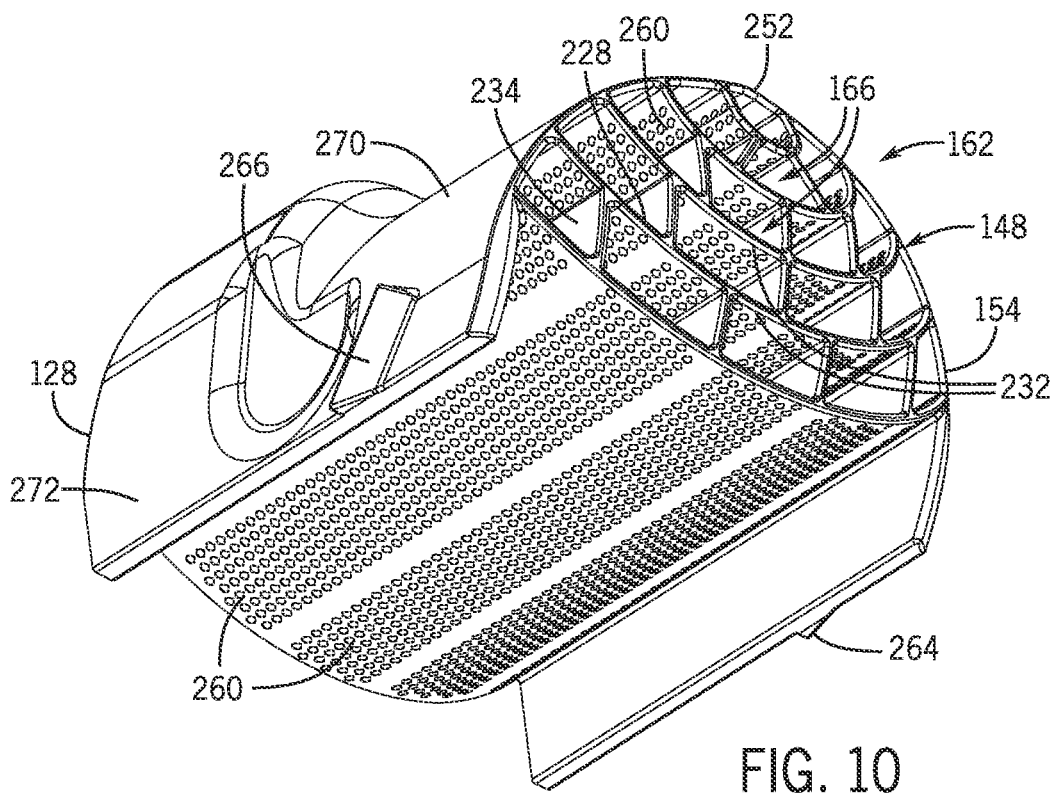
FIG. 10 is a bottom, front isometric view of the noise attenuator of FIG. 9.
Figure 11:
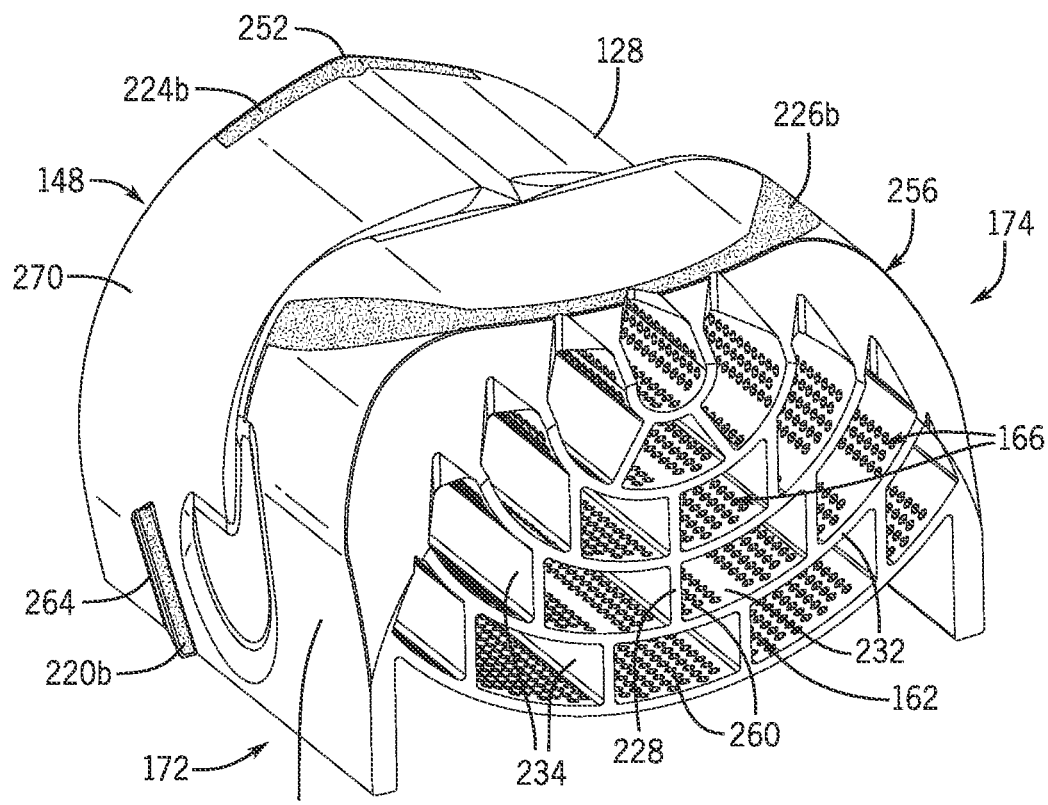
FIG. 11 is a top, rear isometric view of the noise attenuator of FIG. 9.

With continued reference to FIGS. 9-11, some of the partitions separating the individual channels of the plurality of channels 166 (e.g., the channel walls 228 as shown) can include openings 260, including as can allow cross-flow between channels along a general flow path through the valve 100. In particular, in the illustrated embodiment, each of the row walls 232 separating the rows of channels includes an array of openings 260 (e.g., a regular mesh pattern, as shown) that extends through the row walls 232. Thus, the array of openings 260 can fluidly connect the plurality of channels 166 across the rows 240, 242, 244, 246, 248. Additionally, in the illustrated embodiment, the sidewalls 234 of the plurality of channels 166 are configured as solid sidewalls. However, in other embodiments, one or more of the sidewalls 234 can include openings, similar to the array of openings 260.

As described above, the plurality of channels 166 can collectively define the trim inlet profile 154 at the inlet 148 of the trim 128. The trim inlet profile 154 can define a profile that is geometrically similar to the flow control body inlet profile 152. In this regard, the inlet profile 154 can be aligned with and nested within the inlet profile 152 of the flow control body 126 when the trim 128 is secured relative to the flow control body 126.

Still referring to FIGS. 9-14, the trim 128 can further include first and second locating tabs 264, 266 at the respective first and second lateral sides 172, 174. In the illustrated example, the locating tabs 264, 266 are generally configured as wedges having a narrowed portion facing the trim inlet 148 and a wider portion facing the trim outlet 256. The first and second locating tabs 264, 264 define respective first and second constraint surfaces 220*b*, 222*b*. The first and second constraint surfaces 220*b*, 222*b* of the trim 128 are dimensioned to align with and engage the first and second constraint surfaces 220*a*, 222*a* of the flow control body 126 to align the trim 128 with the flow control body 126 during an assembly process (and subsequently after the assembly process is complete).

The first and second locating tabs 264, 266 generally extend laterally outward from the respective first and second lateral sides 172, 174 of the trim 128. Their respective constraint surfaces 220*b*, 222*b* face the trim outlet 256 (see, for example, FIG. 11). Additionally, the first and second locating tabs 264, 266 are generally disposed on a first body portion 270 of the trim 128. In the illustrated embodiment, the trim 128 includes the first body portion 270 and the second body portion 272. As shown, the first body portion 270 includes the trim inlet profile 154 and the second body portion 272 includes the trim outlet profile 256. Additionally, in the illustrated embodiment, the first body portion 270 generally defines a narrowed portion of the trim 128 and the second body portion 272 generally defines a wider portion of the trim 128.

The trim 128 can further include a third constraint surface 224*b* configured to engage the third constraint surface 224*a* of the flow control body 126. The third constraint surface 224*b* of the trim 128 can be disposed along an exterior surface of the trim 128 at the trim inlet apex 252 of the trim inlet profile 154. In particular, as shown, the third constraint surface 224*b* can be spaced apart from a wider (trailing) portion of flow control body 126 that includes the fourth constraint surface 226*b* by a reduced width (leading) portion of the flow control body 126 (e.g., that also includes locating tabs, as further discussed below). The third constraint surface 224*b* can be configured as an inlet engagement surface. The third constraint surface 224*b* extends laterally on either side of the trim inlet apex 252 and generally forms a V-shape. The V-shape is complementary to the trim inlet profile 154, the flow control body inlet profile 152, and the third constraint surface 224*a* of the flow control body 126.

With reference to FIGS. 9 and 11, the fourth constraint surface 226*b* is disposed along the exterior surface of the trim 128 at the second body portion 272 adjacent to the trim outlet profile 256. The fourth constraint surface 226*b* extends between the first and second lateral sides 172, 174 of the trim 128, and generally extends forward from a central trailing portion of the trim (e.g., at the trailing edge of the trim body 128 as shown) toward a leading portion of the trim (e.g., to a transition between the wider and narrower portions of the trim body 128 also discussed above). Correspondingly, the fourth constraint surface 226*b* forms a generally U-shaped profile with a base and two legs extending therefrom, with the legs of the profile in particular extending laterally to the outside of the third (apex) constraint surface 224*b*.

As briefly described above, when the first constraint surface 220*a* of the flow control body 126 engages the first constraint surface 220*b* of the trim 128, the second constraint surface 222*a* of the flow control body 126 engages the second constraint surface 222*b* of the trim 128, the third constraint surface 224*a* of the flow control body 126 engages the third constraint surface 224*b* of the trim 128, and the fourth constraint surface 226*a* of the flow control body 126 engages the fourth constraint surface 226*b* of the trim 128, the trim 128 can be appropriately spatially constrained relative to the flow control body 126 for operation. In particular, in the illustrated example, the trim 128 can be constrained by the constraint surface contact relative to every direction, including rotational directions, except a single linear direction in which the trim 128 can be inserted into the flow control body 126 during an assembly process.

During an assembly process, once the trim 128 is inserted and aligned with the flow control body 126 so that each of the respective constraint surfaces are in engagement, the trim 128 can be secured relative to the flow control body 126 so that the trim 128 is not moveable relative to the flow control body 126, including in the single linear direction in which the trim 128 was moved to engage each of the respective constraint surfaces. By way of example, in some embodiments, the trim 128 can be secured relative to the flow control body 126 via welding.

Figure 15:
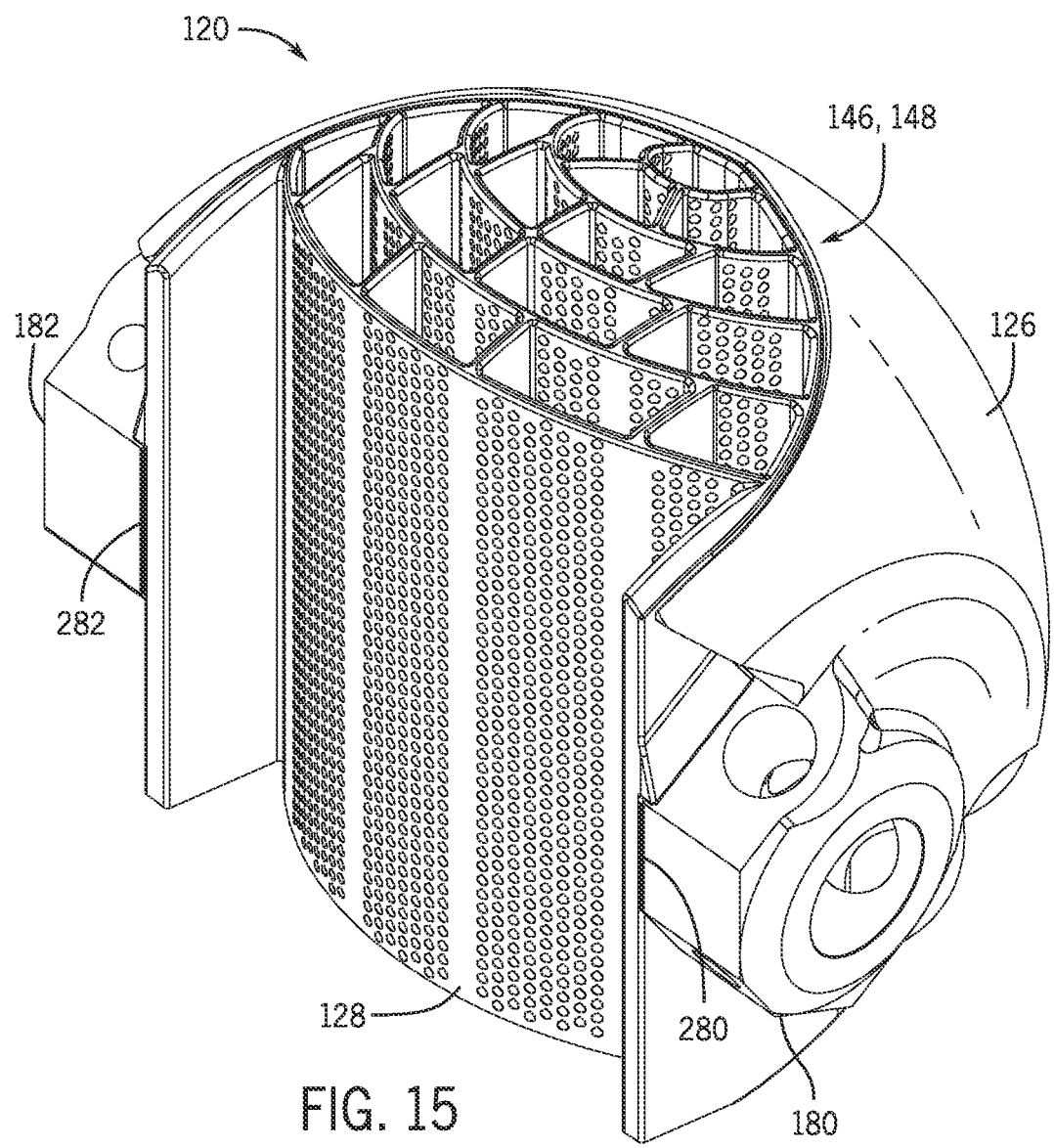
FIG. 15 is a bottom, front isometric view of the noise attenuation assembly of FIG. 4 including weld connections according to an example of the disclosure.

For example, weld connections can be formed between a surface of the trim 128 and a surface of the first and second ears 180, 182. By way of example, FIG. 15 illustrates a weld connection 280 formed between the trim 128 and the ear 180 of the flow control body 126 and a weld connection 282 formed between the trim 128 and the ear 182 of the flow control body 126. The weld connections 280, 282, and particularly their location along lower surfaces of the noise attenuation assembly 120, can facilitate removal of the trim 128 during repairs or maintenance on the valve 100. In some examples, the weld connections 280, 282 can span the length of lower surfaces of the trim 128 that are adjacent to the lower surfaces of the ears 180, 182. However, in other examples, different positions or lengths of weld connections may be formed between the trim 128 and the flow control body 126. For example, in other embodiments, weld connections can be formed at the first and second constraint surfaces 220*a,b*, 222*a,b*. In particular, a weld connection can be formed between each of the first and second locating tabs 264, 266 and the respective first and second ears 180, 182.

In other embodiments, additional or alternative methods of securing the trim 128 relative to the flow control body 126 are possible. For example, the trim 128 can be secured relative to the control body 126 at additional or alternative weld points between the two unitary bodies. In some embodiments, the trim 128 can be pinned, adhered, or crimped to the flow control body 126 to secure the trim 128 relative to the flow control body 126. Additionally, in some embodiments, the trim 128 and flow control body 126 can form a single unitary body. Such single unitary body may be machined, printed, or otherwise formed to provide a noise attenuation assembly in accordance with the present disclosure.

In the illustrated embodiment, the constraint surfaces (220*a*-226*a* and 220*b*-226*b*) of the noise attenuation assembly 120 are shown as speckled or shaded surfaces for clarity of presentation. It should be appreciated that these surfaces can define a variety of textures, including smooth (e.g., machined) or other textures associated with various manufacturing and finishing processes and may not necessarily vary in surface finish from other portions of the trim 128. In other words, the speckled or shading of these constraint surfaces shown in FIGS. 5-14 is intended to highlight preferred areas of engagement of the flow control body 126 and the trim 128 and not to denote particular material or texture (e.g., non-planar or non-smooth surfaces) within the noise attenuation assembly 120. Additionally, these or other constraint surfaces may be used to directionally constrain the trim 128 relative to the flow control body 126, particularly during an assembly process of the noise attenuation assembly 120.

Figure 16:
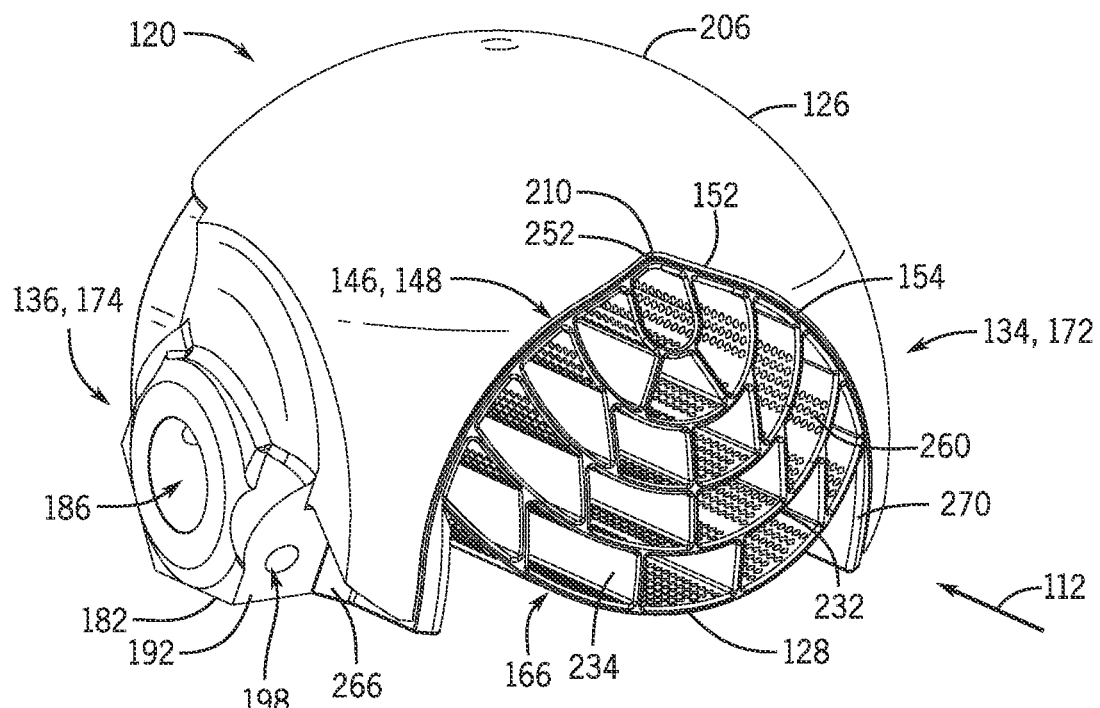
FIG. 16 is a front isometric view of the noise attenuation assembly of FIG. 4.
Figure 17:
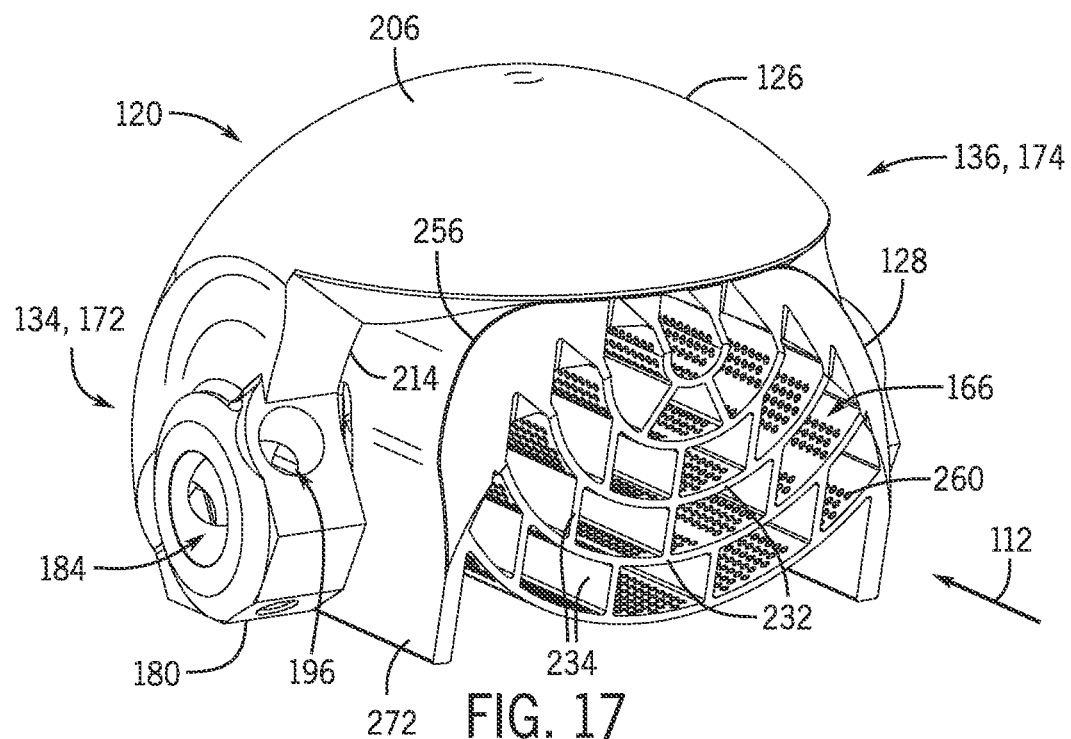
FIG. 17 is a rear isometric view of the noise attenuation assembly of FIG. 4.

FIGS. 16 and 17 show an assembled configuration of the noise attenuation assembly 120. As illustrated in FIG. 16, the trim inlet profile 148 aligns with the flow control body inlet profile 146. Thus, the trim inlet profile 148 does not extend past the flow control body inlet profile 146 (and vice versa) when the trim 128 is aligned with and secured to the flow control body 126. In some embodiments, the trim inlet profile 148 can be recessed relative to the flow control body inlet profile 146.

The recess of the trim inlet profile 148 relative to the flow control body inlet profile 146 can provide a clearance between the trim 128 and a valve seat positioned upstream of the flow control body and trim inlet profiles 146, 148. The valve seal can be positioned between the valve body 102 and a seal retainer. The clearance formed between the flow control body inlet profile 146 and the trim inlet profile 148 (and thus, the valve seal and the trim 128) can prevent the trim 128 from contacting or wearing on the seal and can preserve the sealing capability of the valve seal. The recessed amount of the trim inlet profile 148 relative to the flow control inlet profile 146 can vary based on tolerance stacking or valve size, but in general, is minimized so that the inlet profiles 146, 148 are closely aligned. For example, a clearance between the inlet profiles 146, 148 in the direction of flow 112 may be less than 0.1 inches (3 millimeters). In contrast, as illustrated in FIG. 17, the trim outlet profile 256 extends past the flow control body outlet profile 214 in the axial direction 112 at the lateral sides 172, 174 of the trim 128.

Additionally, in the assembled configuration, as shown in FIGS. 1 and 2 and in isolation in FIGS. 15-17, the trim 128 is secured relative to the flow control body 126 (e.g., via a weld or other attachment) after the trim 128 is aligned with the flow control body 126 by engaging each of the respective constraint surfaces. In general, the constraint surfaces can thus expedite a manufacturing and assembly process of the noise attenuation assembly 120 by providing only a single configuration in which the trim 128 can be received, corresponding to a proper (e.g., intentional) alignment with the flow control body 126 so that the noise attenuation assembly 120 provides noise attenuation within the valve 100.

During an assembly process of the valve 100, the flow control body 126 of the noise attenuation assembly 120 can be configured to be secured to the valve body 102 within the valve fluid pathway 106 before the trim 128 of the noise attenuation assembly 120 is secured relative to the valve body 102. In general, securing the flow control body 126 relative to the valve body 102 before the trim 128 is secured to the flow control body 126 can be beneficial to the assembly process of the noise attenuation assembly 120.

Such benefits can include retrofitting existing ball valves with the attenuation assembly 120 and using existing industry standard balls as the flow control body in the noise attenuation assembly 120. Additionally, securing the trim 128 to the flow control body 126 after the flow control body 126 is installed in the valve body 102 allows for easy and unobstructed installation of the flow control body 126 to the valve body 102. Installing the flow control body 126 within the valve body 102 can include inserting the flow control body 126 into the fluid pathway 106 of the valve body 102 and aligning the valve stem 104 and the shaft follower 140 with respective lateral openings 184, 186 of the flow control body.

Further, as discussed above, one method of manufacturing the trim 128 can include additive manufacturing (e.g., 3D printing). In general, a 3D printed trim can completely eliminate the need for additional machining, which is often expensive, inefficient, and time consuming. The trim 128 according to embodiments of the disclosure can provide an optimized noise attenuator that maximizes flow capacity and noise abatement by providing a geometry that is not found in conventional valves and cannot be easily reproduced using traditional manufacturing methods such as investment casting or machine/welded plates, for example. Furthermore, trim arrangements according to some examples of the disclosure, can reduce or eliminate unnecessary clearances found in conventional noise abatement configurations. Such clearances can lead to uncontrolled expansion of fluid, and thus, unwanted noise. In some conventional valves, these clearances may be found between the lateral sides of a ball and a trim member and/or between the apex of the ball and the trim member.

Thus, examples of the disclosed technology can provide an improvement over conventional noise attenuation arrangements in valves. The previous description of the disclosed examples is provided to enable any person skilled in the art to make or use the disclosed technology. Various modifications to these examples will be readily apparent to those skilled in the art, and the generic principles defined herein may be applied to other examples without departing from the spirit or scope of the disclosed technology. Thus, the disclosed technology is not intended to be limited to the examples shown herein but is to be accorded the widest scope consistent with the principles and novel features disclosed herein.

The invention claimed is:

1. A ball valve, comprising:
    a valve body;
    valve stem;
    a flow control body coupled to the valve stem and including an inlet and an outlet, the flow control body configured to selectively permit fluid flow through the valve body in an axial flow direction depending on a rotational orientation of the valve stem, the flow control body including a ball section, a first mounting structure at a first lateral side of the ball section, relative to the axial flow direction, and a second mounting structure at a second lateral side of the ball section, relative to the axial flow direction, the inlet defining an inlet profile having an inlet apex on the ball section; and
    a trim body having a plurality of channels to control fluid expansion during fluid flow through the valve body, the trim body defining an inlet engagement surface to engage the flow control body at the inlet apex and the trim body being engaged with the first and second mounting structures of the flow control body at first and second lateral sides of the trim body, relative to the axial flow direction, to secure the trim body within a fluid pathway across the flow control body.

2. The ball valve of claim 1, wherein the first mounting structure of the flow control body includes a first ear integrally formed at the first lateral side of the ball section and the second mounting structure of the flow control body includes a second ear integrally formed at the second lateral side of the ball section, and wherein the trim body includes first and second locating tabs, the first and second locating tabs protruding to engage the respective first and second ears of the flow control body to constrain the trim body relative to the flow control body in the axial flow direction.

3. The ball valve of claim 1, wherein the trim body defines a trim inlet profile that is geometrically similar to the inlet profile of the flow control body over substantially all of a lateral width of the inlet profile of the flow control body.

4. The ball valve of claim 1, wherein the plurality of channels are formed by a plurality of channel walls, and wherein at least some of the plurality of channel walls include openings arranged for fluid flow between the channels via the channel walls, along the fluid pathway across the flow control body.

5. The ball valve of claim 1, wherein the flow control body defines a flow control body outlet profile and the trim body extends past the flow control body outlet profile in the axial flow direction.

6. The ball valve of claim 1, wherein the flow control body includes a first constraint surface at the first mounting structure, a second constraint surface at the second mounting structure, a third constraint surface at an inlet apex of an inlet profile of the trim body, and a fourth constraint surface at an outlet profile of the trim body; and wherein each of the first, second, third, and fourth constraint surfaces contacts the trim body to directionally secure the trim body relative to the flow control body.

7. The ball valve of claim 1, wherein the trim body is welded to the flow control body.

8. The ball valve of claim 1, wherein the flow control body is an integrally formed, printed component.

9. A noise attenuation assembly for a ball valve, the noise attenuation assembly comprising:

a ball body including first and second ears configured to secure the ball body to the ball valve for operation, the ball body configured to selectively permit fluid flow through the ball valve via a fluid pathway that extends in an axial flow direction through the ball body, the fluid pathway having a ball inlet and a ball outlet, the ball inlet defining a ball inlet profile that extends from a first lateral side of the ball body to a second lateral side of the ball body; and an attenuator having a plurality of channels that collectively form an attenuator inlet and an attenuator outlet, the attenuator inlet defining an attenuator inlet profile that is geometrically similar to the ball inlet profile and extends from a first lateral side of the attenuator to a second lateral side of the attenuator, the attenuator including first and second locating tabs and secured relative to the ball body within the fluid pathway so that the first and second locating tabs engage the respective first and second ears of the ball body, fluid flow through the ball valve passes through the plurality of channels to reduce noise associated with fluid expansion, and the attenuator inlet profile extends along the ball inlet profile along substantially all of a width of the ball inlet profile between the first and second lateral sides of the ball body.

10. The noise attenuation assembly of claim 9, wherein the first and second ears are axially offset from the ball inlet profile.

11. The noise attenuation assembly of claim 9, wherein the first and second ears define respective first and second constraint surfaces, the first and second locating tabs configured to engage the first and second ears at the respective first and second constraint surfaces.

12. The noise attenuation assembly of claim 11, wherein the ball inlet profile defines a ball inlet apex having a third constraint surface and the attenuator inlet profile defines an attenuator inlet apex, the attenuator inlet apex configured to engage the ball inlet apex at the third constraint surface.

13. The noise attenuation assembly of claim 12, wherein the ball body includes a fourth constraint surface adjacent to the ball outlet, the attenuator dimensioned to engage the ball body at the fourth constraint surface.

14. The noise attenuation assembly of claim 13, wherein engagement of the first, second, third, and fourth constraint surfaces of the ball body with the attenuator constrains the attenuator against movement relative to the ball body, except in a direction opposite an insertion direction for installation of the attenuator into the ball body.

15. The noise attenuation assembly of claim 9, wherein the first locating tab of the attenuator is welded to the first ear of the ball body and the second locating tab of the attenuator is welded to the second ear of the ball body.

16. The noise attenuation assembly of claim 9, wherein the plurality of channels are delimited by a plurality of partitions, and wherein one or more of the plurality of partitions include an array of openings extending therethrough between adjacent channels of the plurality of channels.

17. The noise attenuation assembly of claim 9, wherein the ball outlet defines a ball outlet profile and the attenuator extends past the ball outlet profile in the axial flow direction.

18. A method of assembling a ball valve, the method comprising:

inserting a ball body into a valve body, the valve body including an inlet profile, and outlet profile, and first and second lateral ears that are spaced apart by a fluid pathway, the first lateral ear defining a first constraint surface, the second lateral ear defining a second constraint surface, the inlet profile defining a third constraint surface, and the outlet profile defining a fourth constraint surface; and after inserting the ball body into the valve body, aligning an attenuator within the fluid pathway of the ball body and engaging first and second locator tabs of the attenuator with the respective first and second lateral ears of the ball body at the respective first and second constraint surfaces, and the attenuator further engaging the third and fourth constraint surfaces to secure the attenuator relative to the ball.

\* \* \* \* \*